M. J. CAFFREY.
PIPE CUTTER.
APPLICATION FILED AUG. 9, 1920.
1,373,300. Patented Mar. 29, 1921.
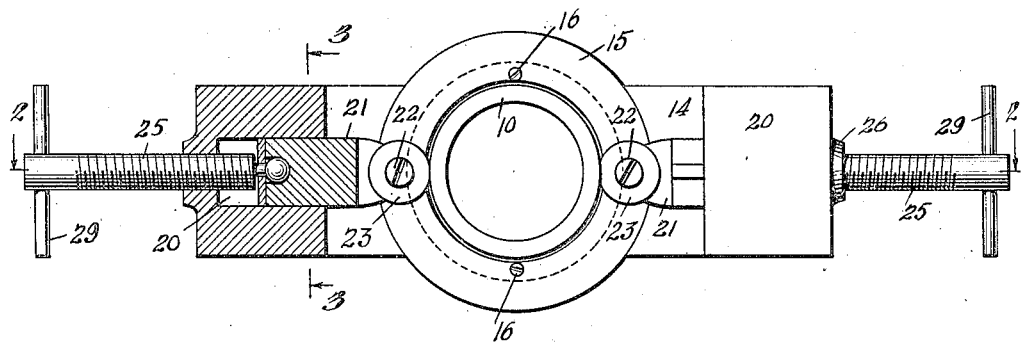
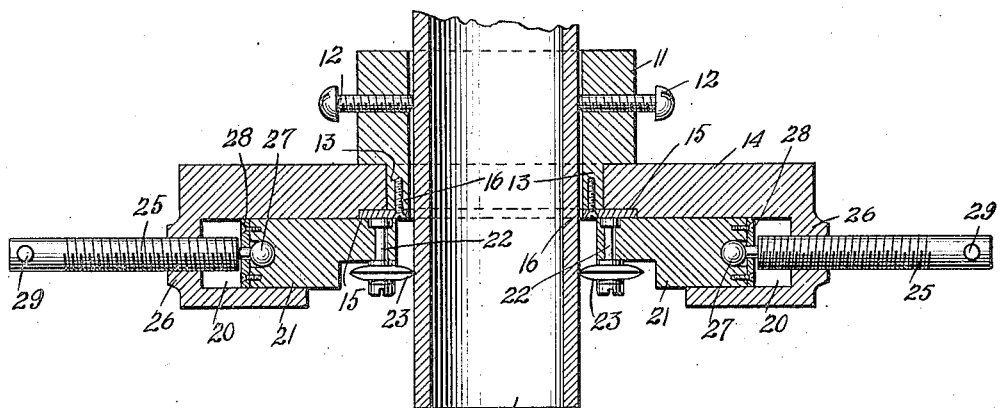
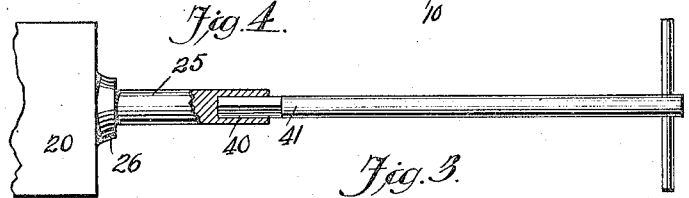
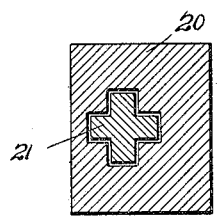
INVENTOR
MAURICE JAMES CAFFREY
BY
ATTORNEYS

UNITED STATES PATENT OFFICE.

MAURICE JAMES CAFFREY, OF NEW YORK, N. Y.

PIPE-CUTTER.

1,373,300.   Specification of Letters Patent.   Patented Mar. 29, 1921.

Application filed August 9, 1920. Serial No. 402,469.

*To all whom it may concern:*

Be it known that I, MAURICE JAMES CAFFREY, a citizen of the United States, and a resident of the city of New York, borough of Manhattan, in the county and State of New York, have invented a new and Improved Pipe-Cutter, of which the following is a full, clear, and exact description.

The object of the invention is to provide a new and improved pipe cutter arranged to permit of cutting a pipe without requiring the use of a vise or other separate means for holding or gripping the pipe while cutting the same.

Another object is to permit accurate cutting of pipes of different diameters and without requiring much physical exertion on the part of the operator.

Another object is to provide a portable pipe cutter which is very simple and durable in construction and composed of comparatively few parts, not liable to get easily out of order.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a front elevation of the improved pipe cutter with parts shown in section;

Fig. 2 is a sectional plan view of the same on the line 2—2 of Fig. 1;

Fig. 3 is a cross section of the same on the line 3—3 of Fig. 1; and

Fig. 4 is a side elevation partly in section of a modified form of one of the feed screws.

The pipe 10 to be cut is centrally held in a tubular holder or hub 11 by the use of set screws 12 screwing in the holder 11 against the peripheral face of the pipe 10, as will be readily understood by reference to Fig. 2. The forward end of the holder 11 is provided with a reduced portion 13 on which is mounted to turn a frame or a stock 14 held in place by a retaining ring 15 fastened by screws 16 to the front end of the holder or hub 11. The frame 14 is provided with diametrically arranged guideways 20, preferably of cross shape in cross section (see Fig. 3), and in the said guideways 20 are mounted to slide blocks 21 supporting studs 22, on which are mounted to turn disk-shaped cutters 23 adapted to engage and cut the pipe 10 circumferentially on feeding the blocks 21 in an inward direction and simultaneously turning the frame or stock 14 on its bearing on the holder 11.

In order to feed the blocks 21 inwardly use is made of feed screws 25 screwing into nuts 26 formed on the outer ends of the frame or stock 14, and the inner ends of the said feed screws 25 have ball and socket connections 27 with the blocks 21 to move the latter inward or outward on turning the screw rod 25 either in one or the other direction. Each of the ball and socket joints 27 is provided with retaining plates 28 screwed on the corresponding block 21 to hold the ball of the ball and socket connection in position in the socket. The outer ends of the feed screws 25 are provided with suitable handles 29 to permit of conveniently turning the feed screws with a view to feed the blocks 21 and consequently the cutters 23 inward during the cutting of the pipe, as above mentioned. It will also be noted that the handles 29 permit of conveniently turning the frame or stock 14 on its bearing on the holder or hub 11.

Instead of the handle 29 on each feed screw, use may be made of an extension handle such as shown in Fig. 4. In this case the outer end of each feed screw is provided with a polygonal socket 40 into which fits a correspondingly shaped end 41 of an extension handle 42 which provides a greater leverage for turning the frame or stock 14 on the hub or holder 11.

It will be noticed that by the arrangement described no separate gripping or fastening means are required for holding the pipe 10 against turning during the cutting operation and by combining a vise for holding the pipe in place with a cutting device mounted to turn on the vise a very simple and effective pipe cutter is provided which can be conveniently fastened in place on the pipe whenever it is desired to cut the same.

It will further be noticed that the pipe cutter is very simple and durable in construction and composed of comparatively few parts not liable to get out of order.

Having thus described my invention, I claim as new and desire to secure by Letters Patent:—

1. A pipe cutter, comprising a tubular holder having a bearing at its forward end and provided with set screws for holding a pipe therein, a frame mounted at its center to turn on the bearing and having oppositely arranged cross-shaped guideways, cross-shaped blocks slidably mounted in the guideways, revoluble cutters mounted on the inner ends of the blocks, and screws mounted in the frame and having ball and socket connections with the said blocks, and provided at their outer ends with handles, said screws serving for adjusting the cutters and also as a means for turning the frame on the holder.

2. A pipe cutter, comprising a tubular holder having a reduced forward end and provided with set screws for holding a pipe therein, a frame mounted at its center to turn on the reduced end of the holder, a ring secured to the holder and engaging the frame and holding it on the reduced end of the holder, the frame having oppositely arranged guideways, blocks slidably mounted in the guideways, rotary cutters on the inner ends of the blocks, and screws mounted in the frame and having their inner ends connected with the blocks and provided at their outer ends with handles to facilitate turning the screws and turning the frame on the holder.

3. A pipe cutter comprising a tubular holder having means for securing a pipe therein, a frame mounted at center to turn on the holder and having two oppositely arranged guideways, blocks slidably mounted in the guideways, a revoluble cutter mounted on the inner end of each block, and screws mounted in the frame and having their inner ends connected with the said blocks and provided with handles at their outer ends, the screws projecting a considerable distance beyond the frame and serving in addition to adjust the cutters, as means for turning the frame on the holder.

MAURICE JAMES CAFFREY.